Aug. 11, 1964 E. KRZYSZCZUK 3,143,923
TURBINE BLADE CUTTING TOOL ATTACHMENT
Filed May 17, 1963 2 Sheets-Sheet 1
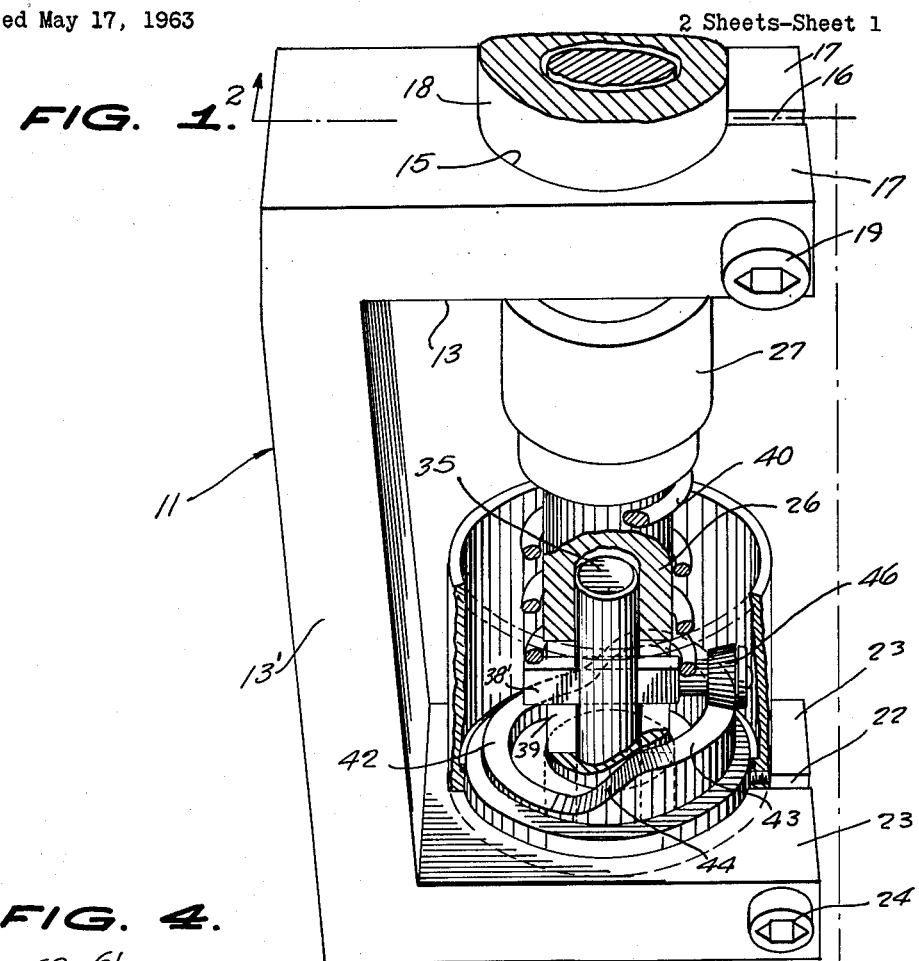
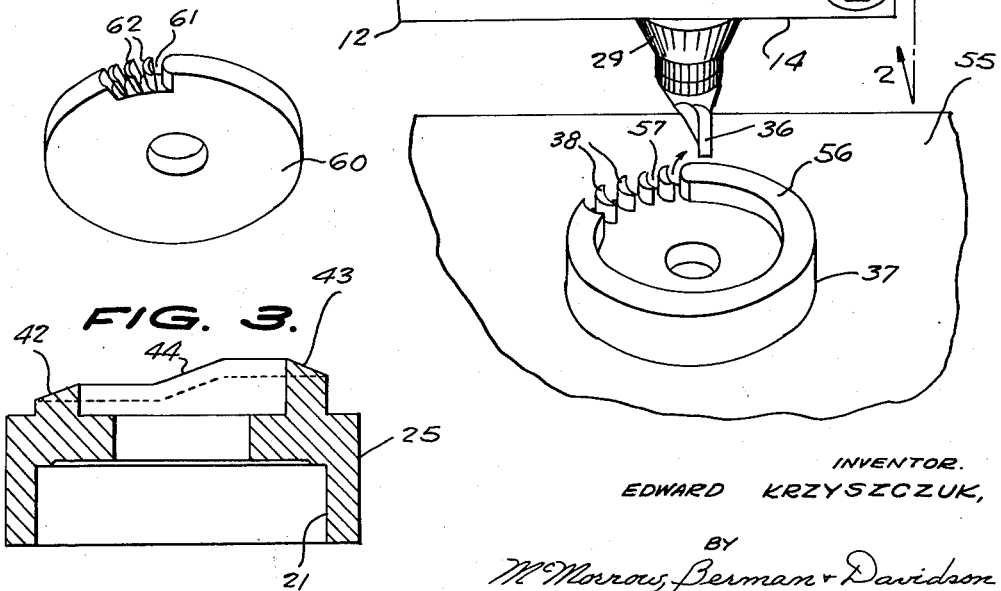
INVENTOR.
EDWARD KRZYSZCZUK,
BY
McMorrow, Berman & Davidson
ATTORNEYS.

INVENTOR.
EDWARD KRZYSZCZUK,
BY
McMorrow, Berman & Davidson
ATTORNEYS.

United States Patent Office 3,143,923
Patented Aug. 11, 1964

3,143,923
TURBINE BLADE CUTTING TOOL ATTACHMENT
Edward Krzyszczuk, 1352 N. St. Louis Ave., Chicago, Ill.
Filed May 17, 1963, Ser. No. 281,186
5 Claims. (Cl. 90—31)

This invention relates to apparatus for fabricating turbine wheels, and more particularly to a milling machine attachment for use in forming turbine wheel blades on a wheel blank.

A main object of the invention is to provide a novel and improved milling machine attachment for use in forming integral turbine blades on a turbine wheel blank, said attachment being relatively simple in construction, being easy to install on a milling machine, and operating with a high degree of accuracy.

A further object of the invention is to provide an improved attachment for a milling machine for use in cutting out the arcuately shaped blades of a turbine wheel, the attachment involving relatively few parts, being inexpensive to manufacture, being durable in construction, and operating in a manner which insures precise uniformity of all the turbine blades, as well as enabling the blades to be formed quickly and efficiently.

Further objects and advantages of the invention will become apparent from the following description and claims, and from the accompanying drawings, wherein:

FIGURE 1 is a perspective view, with parts broken away, showing an improved attachment according to the present invention installed on the spindle guide of a milling machine in operating position.

FIGURE 3 is a vertical cross sectional view taken through the cam bushing employed in the turbine blade cutting attachment of FIGURES 1 and 2.

FIGURE 4 is a perspective view of a typical disc-shaped turbine wheel blank with a number of turbine blades formed in its periphery by means of the blade-cutting attachment of the present invention.

Figure 2:
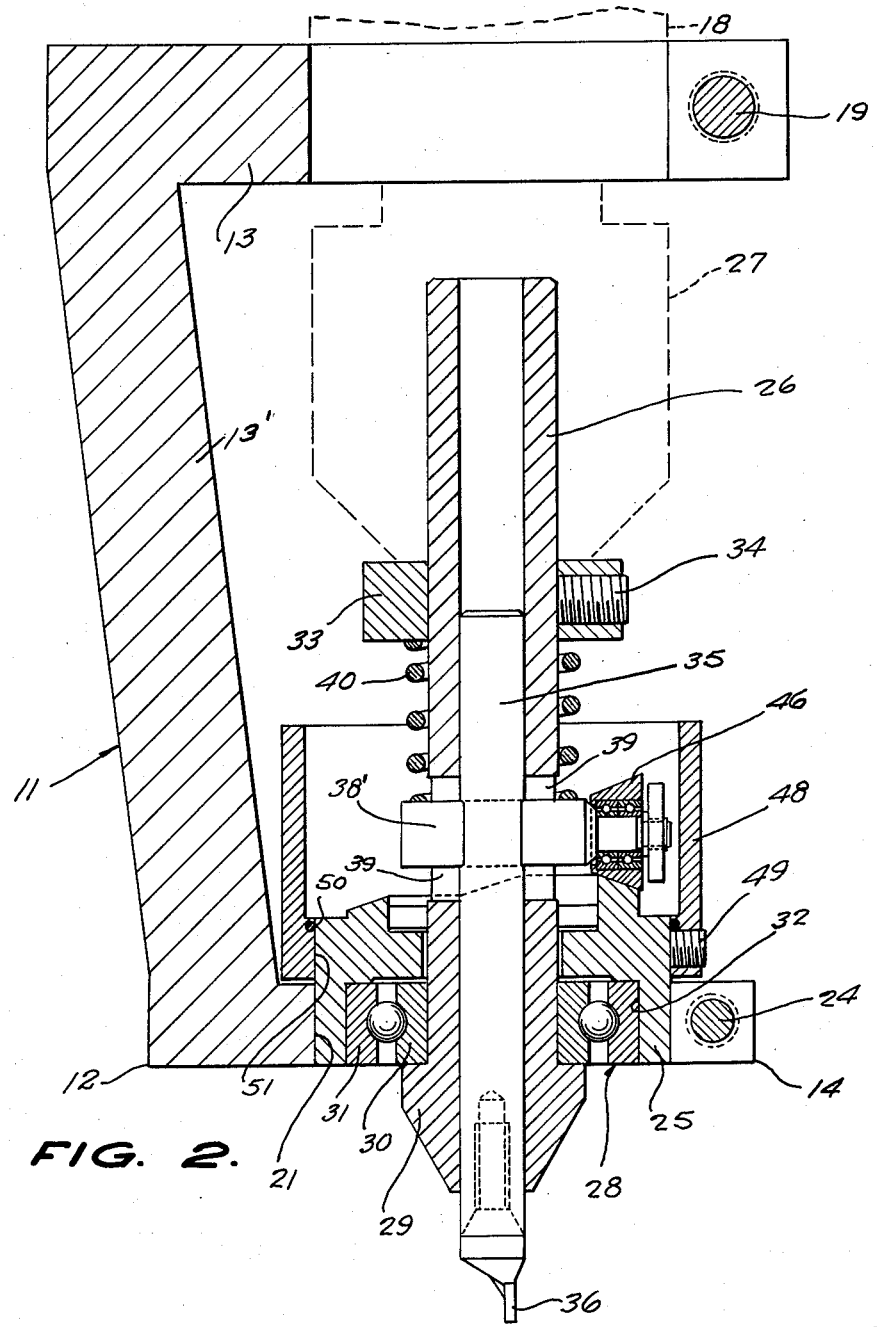
FIGURE 2 is a vertical cross sectional view taken substantially on the line 2—2 of FIGURE 1.

Referring to the drawings, 11 generally designates an improved turbine blade cutting tool constructed in accordance with the present invention. The tool 11 comprises a generally C-shaped bracket member 12 having the parallel top and bottom arms 13 and 14 which are integrally connected by the vertical arm 13', as viewed in FIGURE 1.

The top arm 13 is formed with a generally circular aperture 15 and with a longitudinal slot 16 connecting the aperture 15 to the outer edge of the arm, whereby to define a pair of relatively flexible fingers 17, 17 on opposite sides of the slot 16. The aperture 15 is adapted to clampingly receive the spindle guide 18 of a conventional milling machine, the fingers 17, 17 being clampingly secured together by a clamping screw 19 engaged through one of the fingers 17 and threadedly engage in the other finger 17.

The lower arm 14 is formed with a circular aperture 21 which is aligned with the aperture 15 and which is similarly formed with a slot 22 connecting aperture 21 to the outer edge of arm 14, defining a pair of resilient fingers 23, 23. A clamping screw 24 is engaged through one of the fingers 23 and is threadedly engaged in the opposite finger 23, and a generally annular bushing member 25 is received in the aperture 21 and is clamped therein by tightening the clamping screw 24.

Designated at 26 is a tubular shaft guide member which is adapted to be clampingly received in the chuck 27 of the milling machine, the sleeve-like shaft guide member extending through the bushing 25 and being rotatably supported therein by a ball bearing assembly shown at 28. As shown in FIGURE 2, the shaft guide sleeve 26 has an enlarged bottom portion 29 which is disposed beneath the inner race 30 of the ball bearing assembly 28, the outer race 31 being rigidly secured in a cylindrical recess 32 provided in the bottom of the bushing 25.

A stop collar 33 is provided on the upper portion of the shaft guide sleeve 26, said stop collar being clamped to the sleeve by a set screw 34, as shown in FIGURE 2.

Designated at 35 is a cutter shaft which is slidably mounted in the sleeve 26, the cutter shaft 35 being provided at its bottom end with an offset depending cutting blade 36 which is spaced from the axis of the shaft 35 by the distance corresponding to the radius of the groove to be cut in a turbine wheel blank 37 to form the desired turbine blades 38, shown in FIGURE 1.

The cutting blade 36 may be secured in any suitable manner to the bottom end of the shaft 35, for example, by being press-fitted therein.

Transversely secured in the upper portion of the cutter shaft 35 is an arm 38' which extends through a pair of diametrically opposed longitudinal slots 39, 39 formed in the sleeve 26 and being of sufficient length to allow for a substantial amount of axial movement of the shaft 35 in the sleeve 26, for a purpose presently to be explained. A coiled spring 40 surrounds the sleeve 26, bearing between the arm 38' and the collar 33, and biasing the cutter shaft 35 downwardly.

The bushing member 25 is provided with a cam-shaped top edge consisting of the generally frusto-conical relatively low portion 42 and the generally frusto-conical relatively high portion 43 located opposite the low portion 42 and merging therewith at diametrically opposed inclined sloping portions 44.

Journaled on one end of the arm 38' is a generally frusto-conical follower roller 46 which continuously engages the cam-shaped top edge of the bushing member 25, being biased into such engagement by the coiled spring 40.

Secured on the upper portion of the periphery of the bushing member 25 is a generally cylindrical flange 48, secured rigidly to the periphery of the bushing 25 by a set screw 49, and making a fluid tight engagement therewith by the provision of a resilient deformable sealing gasket 50 disposed in a suitable seat provided therefor on the inside surface of the bottom bore 51 of the flange member 48. Thus, the cylindrical flange or shell member 48 defines a reservoir for lubricating oil for lubricating the follower 46 and the cam-shaped top edge of the bushing member 25. As shown in FIGURE 2, the cam-shaped top edge is located inwardly of the upstanding cylindrical flange or shell 48, providing ample clearance for the follower roller 46.

It will be noted that when the top arm 13 is clamped to the stationary spindle guide 18 of the milling machine the bracket member 12 is fixed relative to the milling machine but the sleeve 26 may be rotated by the milling machine chuck 27. With the sleeve 26 clamped in the chuck 27 and with the parts arranged in the manner above described, rotation of the sleeve 26 is transmitted by the arm 38' to the cutter shaft 35. The cutter shaft is raised and lowered, as viewed in FIGURES 1 and 2, during each revolution of the sleeve 26 by the cooperation of the follower 46 with the cam-shaped top edge of the bushing 25. As will be apparent from FIGURE 1, when the follower roller 46 is engaged on the relatively low cam edge portion 42, the cutter blade 36 is in a lowered position, whereas when the follower roller 46 is on the elevated portion 43 of the cam-shaped top edge of bushing 25, the cutter blade 36 is relatively elevated with respect to its previous position.

In using the attachment, the blank 37 is mounted on a rotatable turntable 55 in a position so that its upstanding peripheral flange 56 is engageable by the depending cutting blade 36 with the blank 37 held at the proper position relative to the path of rotation of the cutting blade to form the desired grooves 57 in the blank. The cutting blade 36 rotates in the direction of the arrow shown in FIGURE 1, namely, in a clockwise direction, as viewed in FIGURE 1, so that the blade 36 must be raised over the flange 56 after it has completed its cutting action, during each revolution of the shaft 35. This is accomplished by the cooperation of the follower roller 46 with the cam-shaped top edge of bushing 25, as above described. Thus, after each groove 57 is cut to the desired depth the blank 37 is advanced through the necessary angle required to form the next groove in the blank, and the cutting process is repeated. During the cutting process, the tool may be moved downwardly gradually to achieve the desired cutting depth, or conversely, the work may be fed upwardly toward the tool. In either case, the cooperation of the cam follower roller 46 with the cam-shaped top edge of the bushing 25 elevates the cutting blade 36 over the flange 56 of the blank during approximately one-half of the cycle of revolution of the cutting blade, to cause the cutting blade to clear the flange 56, after which it descends in position for the next cutting stroke required to form the desired groove 57.

Turbine wheels of the disc type may be likewise machined using the tool 11. For example, a disc 60 may be suitably mounted on a rotatable support with the peripheral portion of the disc disposed in the path of movement of the cutting blade 36 and may be held so that the respective grooves 61, forming the blade 62 of the turbine wheel may be cut out in the same manner as the groove 57. Thus, after each cutting stroke, the blade is elevated to pass over the peripheral edge of the blank 60 and subsequently lowered so that it may perform the next succeeding cutting stroke. After a groove 61 is cut to the desired depth, the blank 60 may be rotated through the required angle to prepare it for the cutting of the next succeeding groove.

While a specific embodiment of an improved turbine blade cutting tool has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A turbine blade cutting tool comprising a bracket member having top and bottom arms and means rigidly connecting said arms, means to clamp the top arm to the spindle guide of a milling machine, a bushing member mounted in said bottom arm, a shaft guide sleeve extending rotatably through said bushing member and adapted to be clamped in the chuck of the milling machine, a cutter shaft slidably mounted in said sleeve and being provided at its end with an offset cutting blade, means preventing rotation of said shaft relative to said sleeve, said bushing member having a cam-shaped top edge comprising a relatively low portion and a relatively high portion opposite said low portion, follower means on the cutter shaft engaging said top edge, and spring means biasing said follower means into continuous engagement with said top edge.

2. A turbine blade cutting tool comprising a bracket member having top and bottom arms and means rigidly connecting said arms, means to clamp the top arm to the spindle guide of a milling machine, a bushing member mounted in said bottom arm, a shaft guide sleeve extending rotatably through said bushing member and adapted to be clamped in the chuck of the milling machine, a cutter shaft slidably mounted in said sleeve and being provided at its end with an offset cutting blade, said sleeve being formed with diametrically opposed longitudinal slots, an arm transversely secured to said cutter shaft and extending through said slots, said bushing member having a cam-shaped top edge comprising a relatively low portion and a relatively high portion opposite said low portion, follower means on the arm engaging said top edge, and spring means biasing said follower means into continuous engagement with said top edge.

3. A turbine blade cutting tool comprising a bracket member having top and bottom arms and means rigidly connecting said arms, means to clamp the top arm to the spindle guide of a milling machine, a bushing member mounted in said bottom arm, a shaft guide sleeve extending rotatably through said bushing member and adapted to be clamped in the chuck of the milling machine, a cutter shaft slidably mounted in said sleeve and being provided at its end with an offset cutting blade, said sleeve being formed with diametrically opposed longitudinal slots, an arm transversely secured to said cutter shaft and extending through said slots, said bushing member having a cam-shaped top edge comprising a relatively low portion and a relatively high portion opposite said low portion, follower means on the arm engaging said top edge, a coiled spring on said sleeve above said arm, and a stop collar secured on the sleeve above said spring, said spring engaging the arm at one end and the stop collar at the other end and biasing said follower means into continuous engagement with said top edge.

4. A turbine blade cutting tool comprising a generally C-shaped bracket member having parallel top and bottom arms, said arms being formed with aligned clamping apertures, the aperture in the top arm being adapted to clampingly receive the spindle guide of a milling machine, a bushing member clamped in the aperture of the bottom arm, a shaft guide sleeve extending rotatably through said bushing member and adapted to be clamped in the chuck of the milling machine, a cutter guide slidably mounted in said sleeve and being provided at its end with an offset cutting blade, means preventing rotation of said shaft relative to said sleeve, said bushing member having a cam-shaped top edge comprising a relatively low portion and a relatively high portion opposite said low portion, follower means on the cutter shaft engaging said top edge, and spring means biasing said follower means into continuous engagement with said top edge.

5. A turbine blade cutting tool comprising a generally C-shaped bracket member having parallel top and bottom arms formed with aligned clamping apertures, the aperture in the top arm being adapted to clampingly receive the spindle guide of a milling machine, a bushing member clamped in the aperture of the bottom arm, a shaft guide sleeve extending rotatably through said bushing member and adapted to be clamped in the chuck of the milling machine, a cutter shaft slidably mounted in said sleeve and being provided at its end with an offset cutting blade, said sleeve being formed with diametrically opposed longitudinal slots, an arm transversely secured to said cutter shaft and extending through said slots, said bushing member having a cam-shaped top edge comprising a relatively low portion and a relatively high portion opposite said low portion, a follower roller journaled on the arm and engaging said top edge, a coiled spring on said sleeve above said arm, a stop collar on the sleeve above the spring, said spring engaging the arm at its lower end and the stop collar at its upper end and biasing said follower means into continuous engagement with said top edge.

References Cited in the file of this patent

FOREIGN PATENTS

| | | |
|---|---|---|
| 733,539 | Germany | Mar. 29, 1943 |
| 916,142 | Germany | Aug. 5, 1954 |